United States Patent
Sakumoto et al.

(10) Patent No.: US 10,075,293 B2
(45) Date of Patent: Sep. 11, 2018

(54) INFORMATION PROCESSING APPARATUS, INFORMATION PROCESSING METHOD, AND RECORDING MEDIUM

(71) Applicant: SONY CORPORATION, Tokyo (JP)

(72) Inventors: Koichi Sakumoto, Tokyo (JP); Miwa Ichikawa, Tokyo (JP); Taizo Shirai, Kanagawa (JP); Toyohide Isshi, Kanagawa (JP); Yuji Ide, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 66 days.

(21) Appl. No.: 14/639,361

(22) Filed: Mar. 5, 2015

(65) Prior Publication Data

US 2015/0263854 A1 Sep. 17, 2015

(30) Foreign Application Priority Data

Mar. 14, 2014 (JP) ................................. 2014-052006

(51) Int. Cl.
*H04L 9/32* (2006.01)
*H04L 9/08* (2006.01)

(52) U.S. Cl.
CPC .......... *H04L 9/0869* (2013.01); *H04L 9/0866* (2013.01)

(58) Field of Classification Search
None
See application file for complete search history.

(56) References Cited

U.S. PATENT DOCUMENTS

| | | | | |
|---|---|---|---|---|
| 8,774,338 B1* | 7/2014 | Buck | ...................... | H04L 63/10 375/355 |
| 9,209,970 B2* | 12/2015 | Noda | ..................... | H04L 9/0861 |
| 2008/0019514 A1* | 1/2008 | Stromberg | .............. | H04L 63/06 380/46 |
| 2008/0294902 A1* | 11/2008 | Lu | ........................... | G06F 21/34 713/176 |
| 2009/0046859 A1* | 2/2009 | Bichler | ................. | H04L 9/0872 380/259 |
| 2009/0083859 A1* | 3/2009 | Roth | ....................... | G06F 21/46 726/28 |
| 2010/0199092 A1* | 8/2010 | Andrus | ................. | H04L 9/0844 713/171 |
| 2011/0022851 A1* | 1/2011 | Yokota | .................. | H04L 9/0894 713/189 |
| 2011/0053641 A1* | 3/2011 | Lee | ....................... | G06F 1/1626 455/556.1 |
| 2011/0138459 A1* | 6/2011 | Bae | ........................ | G06F 21/32 726/19 |

(Continued)

FOREIGN PATENT DOCUMENTS

| | | |
|---|---|---|
| JP | 2008-311726 | 12/2008 |
| JP | 2010-187282 | 8/2010 |

(Continued)

*Primary Examiner* — Trang Doan
(74) *Attorney, Agent, or Firm* — Chip Law Group

(57) ABSTRACT

Provided is an information processing apparatus including a sensor data obtaining unit configured to obtain predetermined information from a sensor, the sensor obtaining the predetermined information by sensing, and a key generation unit configured to generate key information for use in an authentication process, based on the information which is obtained by the sensor data obtaining unit during a predetermined period of time.

12 Claims, 12 Drawing Sheets

(56) References Cited

U.S. PATENT DOCUMENTS

| | | | |
|---|---|---|---|
| 2012/0116710 A1* | 5/2012 | Fujiwara | G01P 15/18 |
| | | | 702/141 |
| 2012/0167170 A1* | 6/2012 | Shi | G06F 21/32 |
| | | | 726/2 |
| 2013/0202108 A1* | 8/2013 | Kao | H04L 9/0869 |
| | | | 380/44 |
| 2013/0269030 A1* | 10/2013 | Milford | G06F 21/50 |
| | | | 726/22 |
| 2014/0219452 A1* | 8/2014 | Mayer | G06F 21/44 |
| | | | 380/270 |
| 2015/0117645 A1* | 4/2015 | Carlson | H04L 63/0435 |
| | | | 380/262 |

FOREIGN PATENT DOCUMENTS

| JP | 2011-130224 | 6/2011 |
|---|---|---|
| WO | 2008-075638 | 6/2008 |

* cited by examiner

INFORMATION PROCESSING APPARATUS, INFORMATION PROCESSING METHOD, AND RECORDING MEDIUM

CROSS REFERENCE TO RELATED APPLICATIONS

This application claims the benefit of Japanese Priority Patent Application JP 2014-052006 filed Mar. 14, 2014, the entire contents of which are incorporated herein by reference.

BACKGROUND

The present disclosure relates to information processing apparatuses, information processing methods, and recording media.

Secret information (key) which is used in cryptographic techniques, such as encryption of electronic data, authentication for use of a device or service, electronic signature, etc., need to have a value which is not guessed by third parties. When the secret information is generated by an individual user or device on its own, it is desirable that the secret information have a value which is not found out even by reverse engineering of the program for generating the secret information.

Techniques of allowing an individual or device to generate such secret information on its own are described in, for example, JP 2011-130224A, JP 2010-187282A, JP 2008-311726A, and WO 2008/075638. These documents describe techniques of sensing information, such as an orientation, momentum, acceleration, etc., of an information processing apparatus, and generating secret information using that information as randomness, and sharing that secret information with another apparatus.

SUMMARY

According to the techniques described in the above documents, the same secret information is shared based on information which has been simultaneously sensed by a plurality of apparatuses. When secret information is shared by a plurality of apparatuses, the secret information needs to be the same between the apparatuses. When secret information which is shared by a plurality of apparatuses is generated based on the sensed information, it is difficult for all the apparatuses to obtain exactly the same sensed information due to the influence of a difference between each individual sensor. Therefore, the sensed information is analyzed to obtain information which is similar between each apparatus, and secret information is generated based on the similar information.

Therefore, even if slightly different data has been obtained by sensing, the same secret information may be generated. The technique of analyzing sensed information to use similar information as described above is not desirable, when the sensed information is used as randomness for generation of secret information.

With these circumstances in mind, the present disclosure proposes a novel and improved information processing apparatus, information processing method and computer program which when sensed information is used as randomness for generation of secret information, sufficient randomness can be obtained with less burden on the user and with ease.

According to an embodiment of the present disclosure, there is provided an information processing apparatus including a sensor data obtaining unit configured to obtain predetermined information from a sensor, the sensor obtaining the predetermined information by sensing, and a key generation unit configured to generate key information for use in an authentication process, based on the information which is obtained by the sensor data obtaining unit during a predetermined period of time.

According to another embodiment of the present disclosure, there is provided an information processing method including obtaining predetermined information from a sensor, the sensor obtaining the predetermined information by sensing, and generating key information for use in an authentication process, based on the information which is obtained during a predetermined period of time.

According to another embodiment of the present disclosure, there is provided a non-transitory computer-readable recording medium having a program recorded thereon, the program causing a computer to execute obtaining predetermined information from a sensor, the sensor obtaining the predetermined information by sensing, and generating key information for use in an authentication process, based on the information which is obtained during a predetermined period of time.

As described above, according to one or more embodiments of the present disclosure, a novel and improved information processing apparatus, information processing method and recoding medium are provided which when sensed information is used as randomness for generation of secret information, sufficient randomness can be obtained with less burden on the user and with ease.

Note that the effects described above are not necessarily limited, and along with or instead of the effects, any effect that is desired to be introduced in the present specification or other effects that can be expected from the present specification may be exhibited.

DETAILED DESCRIPTION OF THE EMBODIMENT(S)

Figure 1:
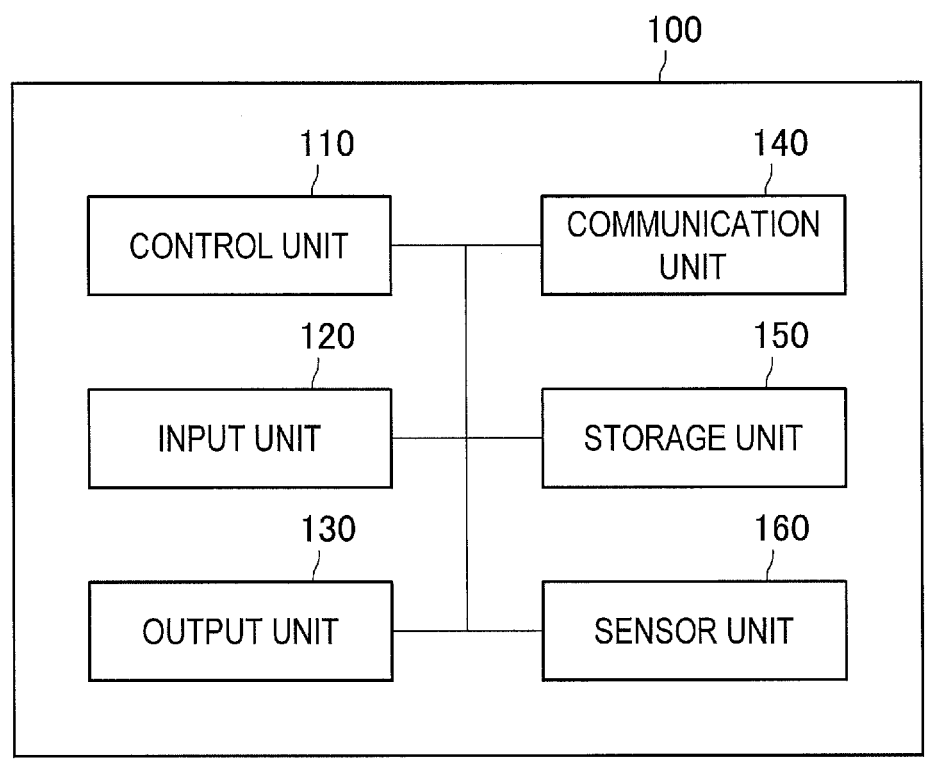
FIG. 1 is an explanatory diagram illustrating an example functional configuration of an information processing apparatus 100 according to an embodiment of the present disclosure.

Hereinafter, preferred embodiments of the present disclosure will be described in detail with reference to the appended drawings. Also, throughout the present specification and the drawings, the same reference numerals are given to constituent elements having substantially the same functional configuration and the repeated description thereof will be omitted.

The description will be given in the following order.
1. Embodiment of the Present Disclosure
   1.1. Example Functional Configuration of Information Processing Apparatus
   1.2. Example Operation of Information Processing Apparatus
2. Example Hardware Configuration
3. Conclusion

1. EMBODIMENT OF THE PRESENT DISCLOSURE

[1.1. Example Functional Configuration of Information Processing Apparatus]

Firstly, an information processing apparatus 100 according to an embodiment of the present disclosure will be described with reference to the accompanying drawings. FIG. 1 is an explanatory diagram illustrating an example functional configuration of the information processing apparatus 100 according to an embodiment of the present disclosure. Next, the example functional configuration of the information processing apparatus 100 according to an embodiment of the present disclosure will be described with reference to FIG. 1.

The information processing apparatus 100 of FIG. 1 may be, for example, an apparatus such as a smartphone, table type terminal, mobile telephone, or PHS, or may be, for example, an apparatus such as a wearable device of wristwatch type, wristband type, finger ring type, glasses type, etc., key chain type device, or the like. The information processing apparatus 100 of FIG. 1 is an apparatus which generates secret information (secret key) which is used in cryptographic techniques, such as encryption of electronic data, authentication for use of a device or service, electronic signature, etc., using sensor data which is obtained by causing the user to shake the apparatus itself As shown in FIG. 1, the information processing apparatus 100 according to an embodiment of the present disclosure is configured to include a control unit 110, an input unit 120, an output unit 130, a communication unit 140, a storage unit 150, and a sensor unit 160.

The control unit 110 controls an operation of the information processing apparatus 100. Specifically, each of the constituent elements of the information processing apparatus 100 of FIG. 1 operates under the control of the control unit 110. The control unit 110, which may be, for example, a microcomputer including a central processing unit (CPU), a read only memory (ROM), a random access memory (RAM), a non-volatile memory unit, and an interface unit, may function as a control unit which controls the entirety of this embodiment. In this embodiment, the control unit 110 has the function of generating key information (e.g., a common key in common key cryptography, and a secret key in public key cryptography) using sensor data which is obtained by the user shaking the information processing apparatus 100. Note that an example functional configuration of the control unit 110 will be described in detail below.

The input unit 120 is an input device which receives the user's input operation. The input unit 120 may be, for example, a touchscreen, keyboard, power supply button, operation button, microphone, or the like.

The output unit 130 is an output device which outputs information which has been processed by the information processing apparatus 100. The output unit 130 may, for example, be a liquid crystal display, organic EL display, loudspeaker, LED indicator, vibrator, or the like. The output of the output unit 130 may, for example, be generated by the control unit 110.

The communication unit 140 exchanges data with an external device. The external device may be, for example, a computer device, smartphone, smartwatch, network server apparatus, or the like. The communication unit 140 may, for example, be configured to perform near-field communication via a network access point through radio communication, or direct radio communication with an external device having a compatible communication function, according to a scheme such as wireless LAN, Bluetooth (registered trademark), or the like. The data which the communication unit 140 exchanges with the external device includes information related to an authentication process between the information processing apparatus 100 and the external device using a secret key generated by the control unit 110. Note that, in addition to information related to an authentication process between the information processing apparatus 100 and the external device, the communication unit 140 may communicate any data that is to be displayed, such as data of video contents, still image contents, electronic books, etc., computer usable data such as image data, text data, spreadsheet data, etc., that are generated by the information processing apparatus 100, game images, and the like.

The storage unit 150 may be, for example, a read only memory (ROM), random access memory (RAM), non-volatile memory unit, or the like. The storage unit 150 stores information which is used by the control unit 110 to control the information processing apparatus 100, computer usable data such as image data, text data, spreadsheet data, etc., that are generated by the information processing apparatus 100, data of an application performed by the information processing apparatus 100, or the like. The storage unit 150 also stores the secret key generated by the control unit 110. It is desirable that an area of the storage unit 150 where the secret key generated by the control unit 110 is stored be tamper-resistant.

The sensor unit 160 is a sensor which detects a motion of the information processing apparatus 100. The sensor unit 160 may be, for example, an acceleration sensor, gravity sensor, gyroscopic sensor, illuminance sensor, linear acceleration sensor, geomagnetic sensor, near-field sensor, a rotation vector sensor, etc. Sensor data obtained by sensing using the sensor unit 160 is obtained by the control unit 110. In this embodiment, the sensor data obtained by sensing using the sensor unit 160 is used to generate a secret key in the control unit 110. This allows the information processing apparatus 100 according to an embodiment of the present disclosure to reduce the burden on the user during generation of a secret key and obtain sufficient randomness with ease during generation of a secret key.

An example functional configuration of the information processing apparatus 100 according to an embodiment of the present disclosure has been described with reference to FIG. 1. Next, an example functional configuration of the control unit 110 included in the information processing apparatus 100 according to an embodiment of the present disclosure will be described.

Figure 2:
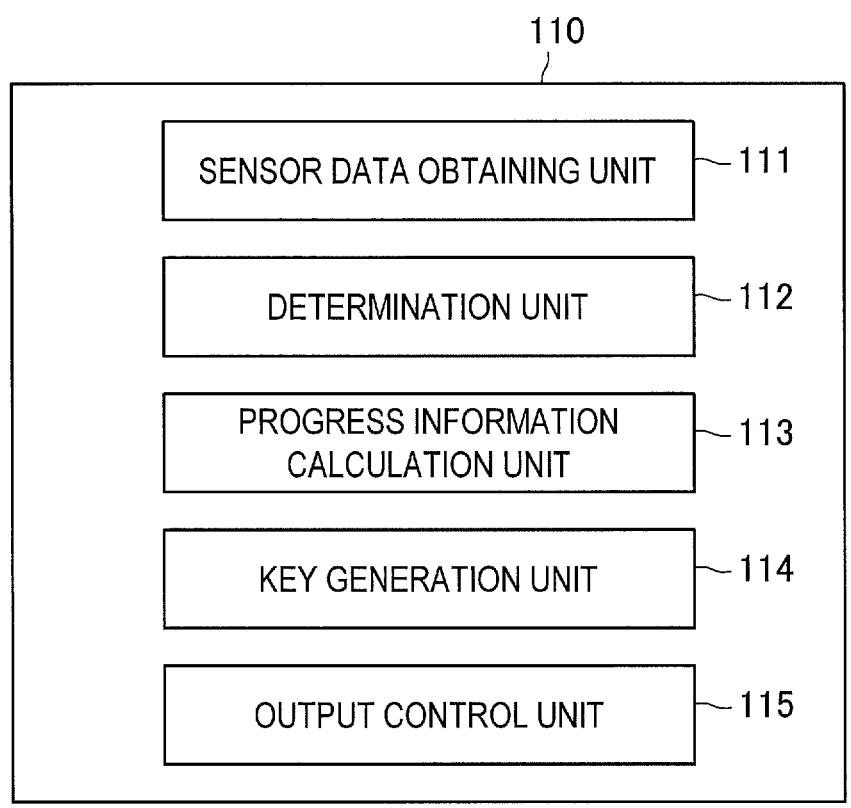
FIG. 2 is an explanatory diagram illustrating an example functional configuration of a control unit 110 included in an information processing apparatus 100 according to an embodiment of the present disclosure.

FIG. 2 is an explanatory diagram illustrating an example functional configuration of the control unit 110 included in the information processing apparatus 100 according to an embodiment of the present disclosure. The example functional configuration of the control unit 110 included in the information processing apparatus 100 according to an embodiment of the present disclosure will be described with reference to FIG. 2.

As shown in FIG. 2, the control unit 110 is configured to include a sensor data obtaining unit 111, a determination unit 112, a progress information calculation unit 113, a key generation unit 114, and an output control unit 115.

The sensor data obtaining unit 111 obtains sensor data obtained by sensing using the sensor unit 160. The sensor data obtaining unit 111 may obtain sensor data obtained by sensing using the sensor unit 160 during a predetermined period of time. For example, the sensor data obtaining unit 111 may start obtaining the sensor data after the user has instructed the sensor data obtaining unit 111 to start obtaining the sensor data. The instruction to start obtaining the sensor data may, for example, be issued based on the user's operation with respect to a screen output by the output unit 130 under the control of the output control unit 115 described below. An example of the screen output by the output unit 130 under the control of the output control unit 115 will be described below. The sensor data obtained by the sensor data obtaining unit 111 from the sensor unit 160 may be used in the processes of the determination unit 112, the progress information calculation unit 113, the key generation unit 114, and the output control unit 115.

The determination unit 112 determines whether or not the sensor data obtained by the sensor data obtaining unit 111 is effective in calculating the "percentage of completion" (described below) in the progress information calculation unit 113 described below. This allows the determination unit 112 to determine whether the sensor data obtained by the sensor data obtaining unit 111 is sensor data which has been obtained by the user shaking the information processing apparatus 100 or mere noise data.

For example, when the sensor data obtained by the sensor data obtaining unit 111 is data obtained by a three-axis acceleration sensor, the determination unit 112 may determine that the user has shaken the information processing apparatus 100, at the time when the absolute value of an acceleration along one, some or all of the axes exceeds a predetermined threshold. Alternatively, the determination unit 112 may determine that the user has shaken the information processing apparatus 100, at the time when the absolute value of a change per unit time in an acceleration along one, some or all of the axes exceeds a predetermined threshold. The result of the determination by the determination unit 112 with respect to the sensor data is used in each of the processes of the progress information calculation unit 113, the key generation unit 114, and the output control unit 115.

The progress information calculation unit 113 calculates progress information until the obtaining of information for use in generation of a secret key in the key generation unit 114 has been completed. As the progress information, the progress information calculation unit 113 calculates the percentage of completion which means the percentage of the sensor data for use in generation of a secret key in the key generation unit 114 which has been obtained, for example. In the following description, it is assumed that the progress information calculation unit 113 calculates the percentage of completion p as the progress information. Next, an example process of calculating the percentage of completion by the progress information calculation unit 113 will be described.

The progress information calculation unit 113 adds a predetermined value per unit time for calculation of the percentage of completion p, for example. For example, the progress information calculation unit 113 adds 5% to the percentage of completion p every second. In addition to the process of adding a predetermined value per unit time, the progress information calculation unit 113 further adds a predetermined value each time the determination unit 112 determines that the sensor data obtained by the sensor data obtaining unit 111 is effective in calculating the percentage of completion in the progress information calculation unit 113. For example, the progress information calculation unit 113 adds a predetermined value (e.g., 1%) to the percentage of completion p each time the determination unit 112 determines that the sensor data obtained by the sensor data obtaining unit 111 is effective in calculating the percentage of completion in the progress information calculation unit 113. In other words, the progress information calculation unit 113 calculates the percentage of completion p so that the more frequently the determination unit 112 determines that the sensor data obtained by the sensor data obtaining unit 111 is effective in calculating the percentage of completion in the progress information calculation unit 113, the more the percentage of completion p increases.

When the percentage of completion p calculated by the progress information calculation unit 113 has reached 100%, sensor data which has been obtained from the start of obtaining sensor data by the sensor data obtaining unit 111 until the percentage of completion p is 100% is sent to the key generation unit 114. Of course, the sensor data obtaining unit 111 may gradually send obtained sensor data to the key generation unit 114, and the key generation unit 114 may generate a key using sensor data which has been obtained until the percentage of completion p calculated by the progress information calculation unit 113 is 100%.

The information indicating the percentage of completion p calculated by the progress information calculation unit 113 may also be gradually sent to the output control unit 115. The output control unit 115 may perform a control so that a real-time situation is presented through the output unit 130 using the information indicating the percentage of completion p calculated by the progress information calculation unit 113.

The key generation unit 114 performs the process of generating a secret key using the sensor data obtained by the sensor data obtaining unit 111. The key generation unit 114 generates a secret key by the calculation process using sensor data which has been obtained from the start of obtaining sensor data by the sensor data obtaining unit 111 until the percentage of completion p calculated by the progress information calculation unit 113 is 100%. Next, an example of the process of generating a secret key by the key generation unit 114 will be described.

The key generation unit 114 may concatenate information unique to the information processing apparatus 100 (e.g., an MAC address) to the value of sensor data obtained by the sensor data obtaining unit 111 at each obtaining event, and compress the data obtained by the concatenation using the secure hash algorithm (SHA), etc., to generate a secret key. Alternatively, the key generation unit 114 may concatenate the value of sensor data obtained by the sensor data obtaining unit 111 at each obtaining event to a bit sequence, set the bit sequence obtained by the concatenation as an entropy, initialize or reseed the seed of a pseudorandom number generation algorithm, generate a random number using the pseudorandom number generation algorithm based on the initialized or reseeded random seed, and output the random number as a secret key. Note that the pseudorandom number generation algorithm is, for example, a deterministic random bit generator (DRBG) such as NIST SP800-90A, etc.

This algorithm includes three steps: initializing a seed; reseeding; and generating a random number. The initializing a seed is to initializing a seed for generating a random number by inputting an entropy, etc. The reseeding is to update the current seed with a new seed by adding an entropy to the current seed. The generating a random number is to actually generate a random number by inputting a random number seed.

The output control unit 115 controls the output of each item of information presented by the output unit 130. For example, the output control unit 115 performs a control to output information based on the sensor data obtained by the sensor data obtaining unit 111 or the progress information calculated by the progress information calculation unit 113 through the output unit 130. This allows for presentation of the state of the sensor data or the progress of the secret key generation process in a manner which allows the user to easily recognize them. An example of the information oubput by the output control unit 115 through the output unit 130 will be described in detail below.

Because the control unit 110 according to an embodiment of the present disclosure has the configuration of FIG. 2, a secret key can be generated using sensor data which is obtained by the user shaking the information processing apparatus 100 or applying vibration to the information processing apparatus 100. Also, because the control unit 110 according to an embodiment of the present disclosure has the configuration of FIG. 2, the state of the sensor data or the progress of the secret key generation process can be presented to the user in a manner which allows the user to easily recognize them.

An example functional configuration of the control unit 110 included in the information processing apparatus 100 according to an embodiment of the present disclosure has been described with reference to FIG. 2. Next, an example operation of the information processing apparatus 100 according to an embodiment of the present disclosure will be described.

[1.2. Example Operation of Information Processing Apparatus]

Figure 3:
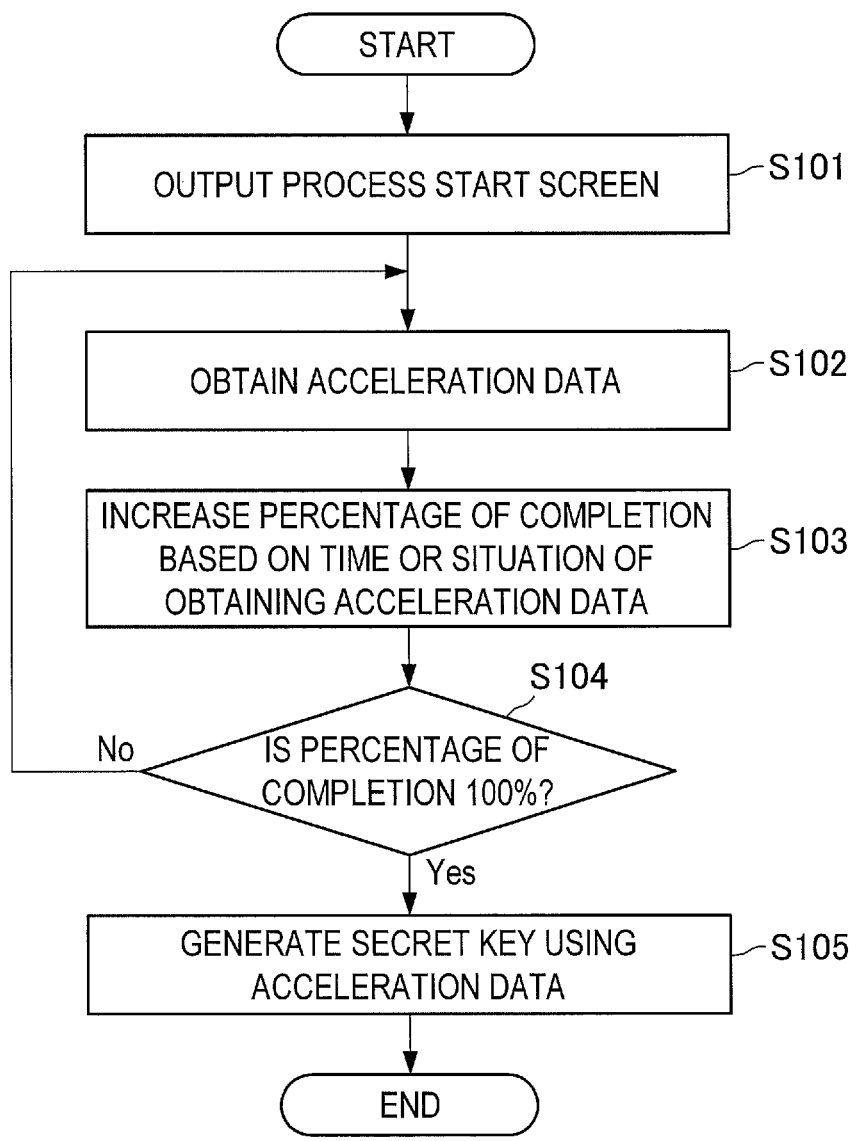
FIG. 3 is a flowchart illustrating an example operation of an information processing apparatus 100 according to an embodiment of the present disclosure.

FIG. 3 is a flowchart illustrating an example operation of the information processing apparatus 100 according to an embodiment of the present disclosure. FIG. 3 illustrates an example operation of the information processing apparatus 100 which is performed during the process of generating a secret key using sensor data which is obtained by the user shaking the information processing apparatus 100 or applying vibration to the information processing apparatus 100. Next, the example operation of the information processing apparatus 100 according to an embodiment of the present disclosure will be described with reference to FIG. 3.

In the process of generating a secret key using sensor data which is obtained by the user shaking the information processing apparatus 100 or applying vibration to the information processing apparatus 100, the information processing apparatus 100 outputs a predetermined process start screen to the output unit 130 (step S101). The process of outputting the process start screen in step S101 may, for example, be performed by the output control unit 115. The predetermined process start screen output to the output unit 130 may, for example, be output to the output unit 130 by execution of an application of generating a secret key.

Figure 4:
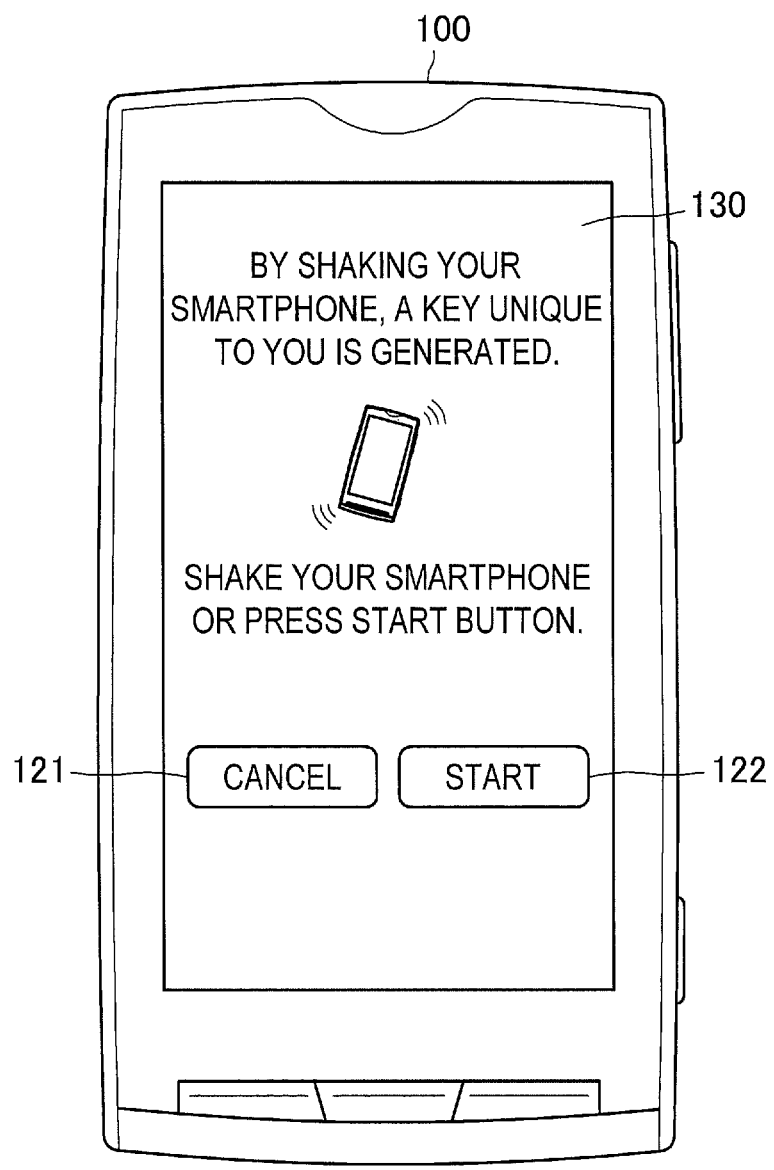
FIG. 4 is an explanatory diagram illustrating an example screen which is output to an output unit 130 by an information processing apparatus 100 according to an embodiment of the present disclosure.

FIG. 4 is an explanatory diagram illustrating an example of the process start screen which is output to the output unit 130 by the information processing apparatus 100 according to an embodiment of the present disclosure. FIG. 4 illustrates an example screen which is output to the output unit 130 by the information processing apparatus 100 executing an application of generating a secret key. The screen of FIG. 4 displays a cancel button 121 and a start button 122. The start button 122 is for causing the information processing apparatus 100 to start the key generation process. The information processing apparatus 100, when detecting the user's touch on the start button 122, starts the key generation process. The cancel button 121 is for ending the application of generating a secret key. The information processing apparatus 100, when detecting the user's touch on the cancel button 121, ends the application of generating a secret key. The information processing apparatus 100 according to an embodiment of the present disclosure can cause the user to start the key generation process by outputting the process start screen of FIG. 4 to the output unit 130.

Note that when the user's touch on the start button 122 is not detected while the process start screen of FIG. 4 is being output to the output unit 130, then if it is determined based on the sensor data obtained by the sensor data obtaining unit 111 that the user has shaken the information processing apparatus 100 at at least a predetermined acceleration, the information processing apparatus 100 may start the key generation process.

After, in step S101, the process start screen has been output and the user has instructed the information processing apparatus 100 to start the key generation process, the information processing apparatus 100 obtains a series of acceleration data obtained by the sensor unit 160 (step S102). The process of obtaining acceleration data in step S102 may, for example, be performed by the sensor data obtaining unit 111.

After having obtained a series of acceleration data obtained by the sensor unit 160 in step S102, the information processing apparatus 100 increases the percentage of completion p based on the elapsed time or the situation of obtaining acceleration data (step S103). The process of calculating the percentage of completion p in step S103 may, for example, be performed by the progress information calculation unit 113.

The information processing apparatus 100, for example, adds a predetermined value per unit time to calculate the percentage of completion p in step S103. For example, the information processing apparatus 100 adds 5% to the percentage of completion p every second to calculate the percentage of completion p in step S103. In addition to the process of adding a predetermined value per unit time, if the sensor data obtained by the sensor data obtaining unit 111 is effective in calculating the percentage of completion p in step S103, the information processing apparatus 100 further adds a predetermined value.

For example, the information processing apparatus 100, if the sensor data is effective in calculating the percentage of completion p in step S103, further adds 1% to the percentage of completion p. In other words, the more effective the sensor data obtained by the sensor data obtaining unit 111 is in calculating the percentage of completion p in step S103, the more the increase in the percentage of completion p which is calculated in step S103 by the information processing apparatus 100.

Figure 5:
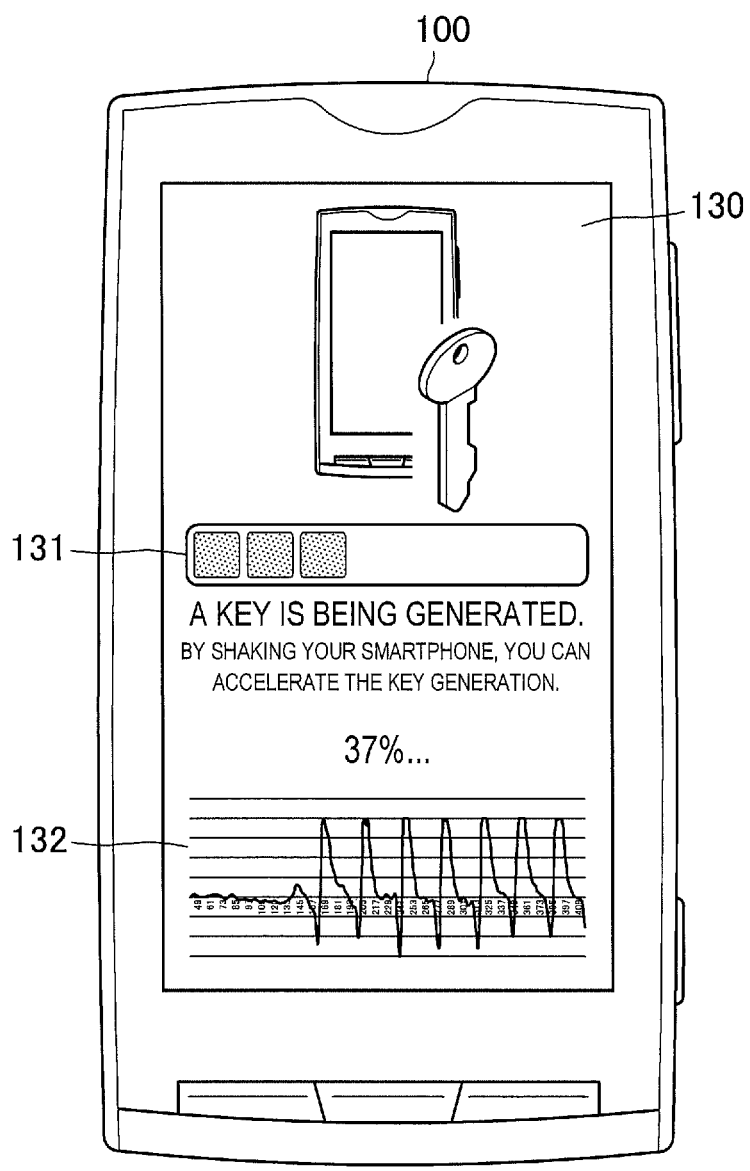
FIG. 5 is an explanatory diagram illustrating an example screen which is output to an output unit 130 by an information processing apparatus 100 according to an embodiment of the present disclosure.

After having calculated the percentage of completion p in step S103, the information processing apparatus 100 may output information based on the calculated percentage of completion p through the output unit 130. FIG. 5 is an explanatory diagram illustrating an example screen which is output to the output unit 130 by the information processing apparatus 100 according to an embodiment of the present disclosure. FIG. 5 illustrates an example screen which is output to the output unit 130 after the user has instructed the information processing apparatus 100 to start the key generation process. FIG. 5 illustrates a situation in which a progress bar 131 which varies depending on an increase in the percentage of completion p, and acceleration data 132, are output to the output unit 130. By outputting the screen of FIG. 5 through the output unit 130, the information processing apparatus 100 can present the progress of the key generation process to the user. Although FIG. 5 illustrates a situation in which the value of the percentage of completion p is output to the output unit 130, the information processing apparatus 100 may output, to the output unit 130, only the progress bar 131 which varies depending on an increase in the percentage of completion p, without outputting the percentage of completion p to the output unit 130.

The information processing apparatus 100 may display all acceleration data along the three axes, i.e., the X, Y and Z axes, together on the output unit 130. Note that if all the data is displayed, the randomness which is used in key generation may be exposed to third parties. Therefore, it is desirable that, for example, the information processing apparatus 100 display only a portion of the data or display the data with a reduced accuracy so that the randomness which is used in key generation is not exposed to third parties.

Of course, the screen for presenting the progress of the key generation process is not limited to the above example. Alternatively, the information processing apparatus 100 may output the progress of the key generation process through the output unit 130 using changes in color, sound, etc., in addition to the display of the progress bar 131 or the value of the percentage of completion on the screen. For example, the information processing apparatus 100 may output sounds which increase in a stepwise fashion, such as C4, D4, E4, F4, G4, A4, B4, C5, D5, E5, F5, G5, A5, B5, . . . , etc., through the output unit 130 each time the percentage of completion p increases by 5%. Also, for example, the information processing apparatus 100 may perform a display control so that the color of the screen output through the output unit 130 gradually changes as the percentage of completion increases. Also, for example, the information processing apparatus 100 may perform a display control so that a predetermined pattern having a plurality of colors is initially displayed on the output unit 130, and the colors gradually mix together with each other as the percentage of completion increases.

After has performed the process of increasing the percentage of completion p in step S103, the information processing apparatus 100 determines whether or not the increased percentage of completion p has reached 100% (step S104). The determination in step S104 may, for example, be performed by the progress information calculation unit 113.

If the result of the determination in step S104 is positive, then the information processing apparatus 100 generates a secret key using acceleration data which has been obtained from the start of the key generation process until the percentage of completion p is 100% (step S105). The process of generating a secret key in step S105 may, for example, be performed by the key generation unit 114. Note that when the percentage of completion p has reached 100%, the information processing apparatus 100 may, for example, notify the user that the percentage of completion p has reached 100%, by vibration of a vibrator. The information processing apparatus 100 generates a secret key using acceleration data which has been obtained until the percentage of completion p is 100%, and therefore, sensor data which is caused by vibration of the vibrator does not affect the generation of a secret key.

On the other hand, if the result of the determination in step S104 is negative, the information processing apparatus 100 returns to step S102, in which the process of obtaining acceleration data is continued.

Figure 6:
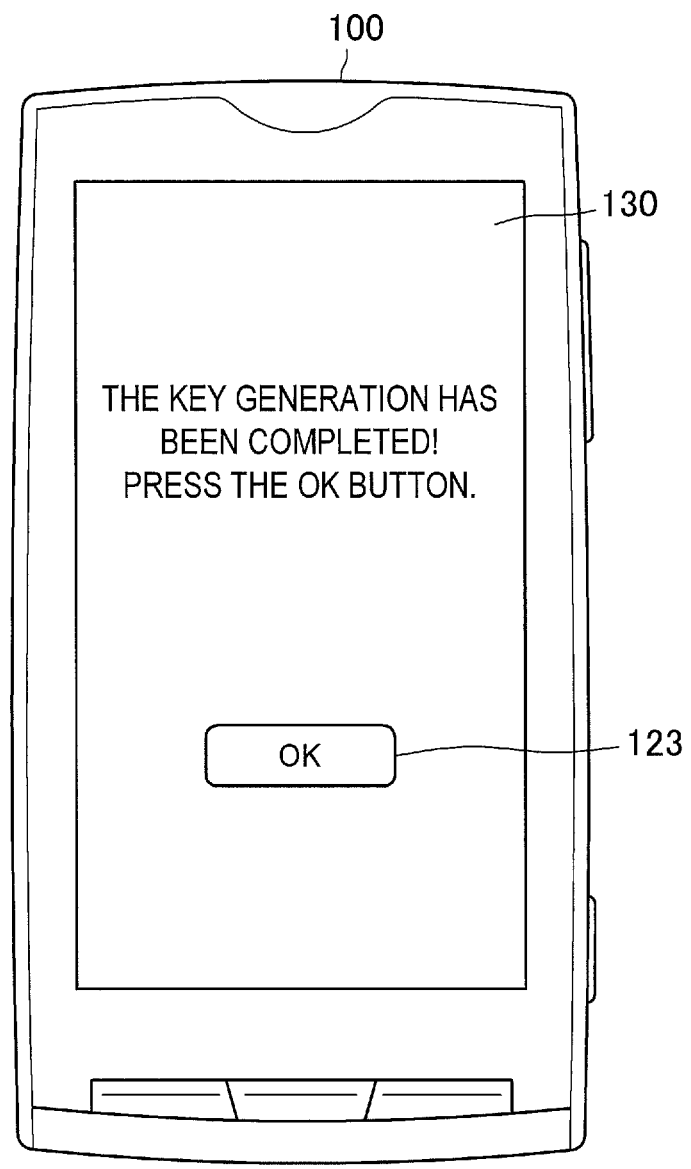
FIG. 6 is an explanatory diagram illustrating an example screen which is output to an output unit 130 by an information processing apparatus 100 according to an embodiment of the present disclosure.

When the percentage of completion p has reached 100%, and the generation of a secret key using acceleration data has been completed, the information processing apparatus 100 may output a screen indicating the completion of the secret key generation through the output unit 130. FIG. 6 is an explanatory diagram illustrating an example screen which is output to the output unit 130 by the information processing apparatus 100 according to an embodiment of the present disclosure. FIG. 6 illustrates an example screen output to the output unit 130 when the information processing apparatus 100 has completed the secret key generation. An OK button 123 is displayed on the screen of FIG. 6. The information processing apparatus 100, when detecting the user's touch on the OK button 123, ends the application of generating a secret key.

By performing the above series of steps, the information processing apparatus 100 according to an embodiment of the present disclosure can generate a secret key using sensor data which is obtained by the user shaking the information processing apparatus 100 or applying vibration to the information processing apparatus 100. Also, by performing the above series of steps, the information processing apparatus 100 according to an embodiment of the present disclosure can present the state of the sensor data or the progress of the secret key generation process to the user in a manner which allows the user to easily recognize them.

Next, an example process of determining, in the determination unit 112, whether or not data is effective in calculating the percentage of completion in the progress information calculation unit 113, i.e., whether or not acceleration data caused by the user shaking the information processing apparatus 100 has been obtained by the sensor data obtaining unit 111, during calculation of the percentage of completion p in the progress information calculation unit 113, will be described.

Figure 7:
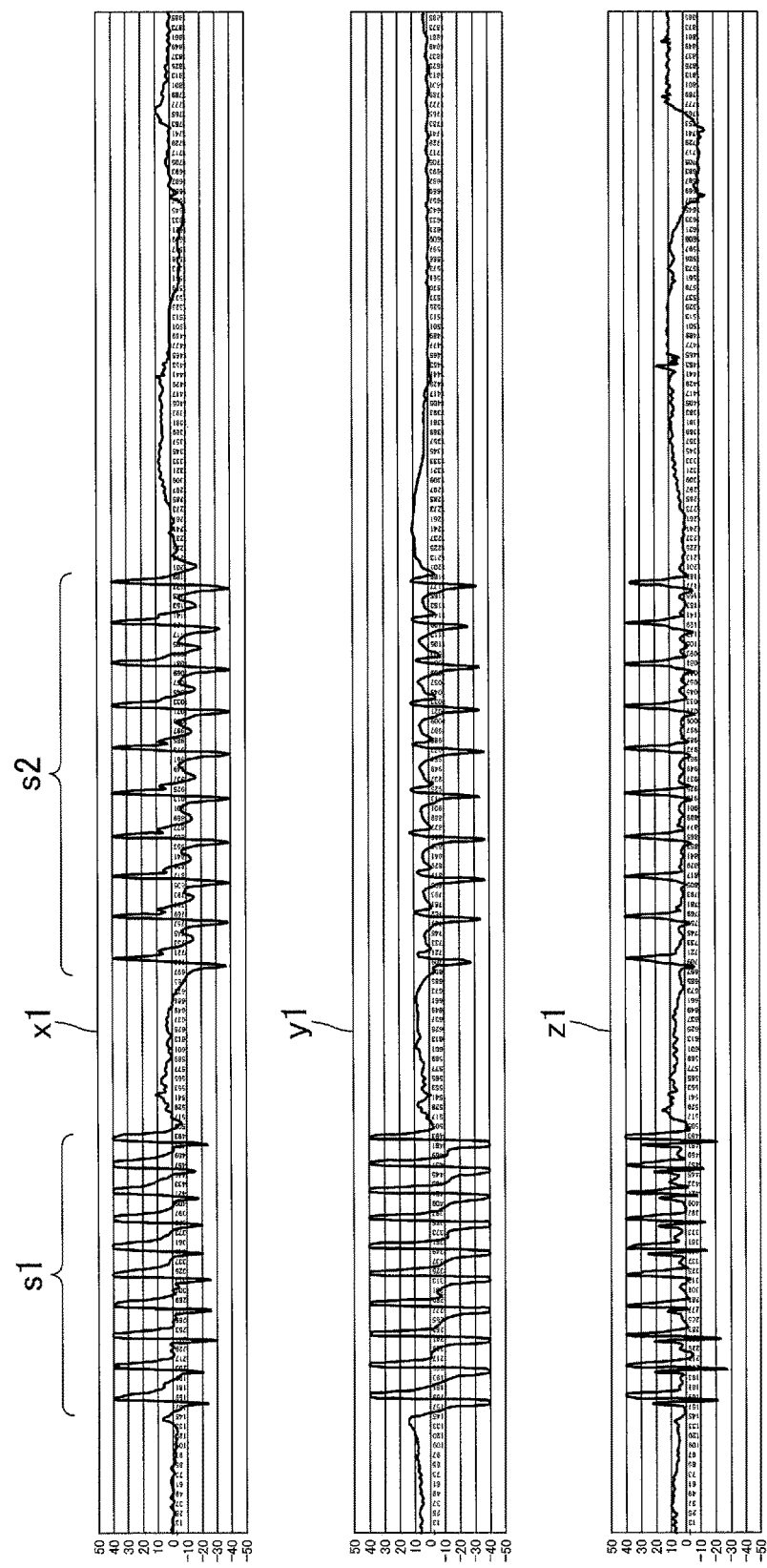
FIG. 7 is an explanatory diagram illustrating an example graph of output data of a three-axis acceleration sensor.

As described above, if the three-axis acceleration sensor has output sensor data, then when the absolute value of an acceleration along one, some or all of the axes has exceeded a predetermined threshold, the determination unit 112 may determine that the user has shaken the information processing apparatus 100. FIG. 7 is an explanatory diagram illustrating an example graph of the output data of the three-axis acceleration sensor. FIG. 7 illustrates data x1 along the x-axis, data y1 along the y-axis, and data z1 along the z-axis.

FIG. 7 also illustrates sections s1 and s2 during which the user has shaken the information processing apparatus 100.

For example, if the absolute value of any one of values $X_i$, $Y_i$, and $Z_i$, in the X, Y, and Z directions, respectively, of i-th data of the acceleration sensor has exceeded a predetermined threshold $C_1$, i.e., $|X_i|>C_1$, $|Y_i|>C_1$, or $|Z_i|>C_1$, the determination unit 112 determines that the user has shaken the information processing apparatus 100 at the time of the i-th data.

Note that if it is determined that the user has shaken the information processing apparatus 100 simply based on the situation in which the absolute value of an acceleration has exceeded a predetermined threshold, the determination unit 112 is likely to determine that the user has shaken the information processing apparatus 100, due to the influence of noise which is, for example, caused when the user is on a vehicle, even when the user has not actually shaken the information processing apparatus 100.

Figure 8:
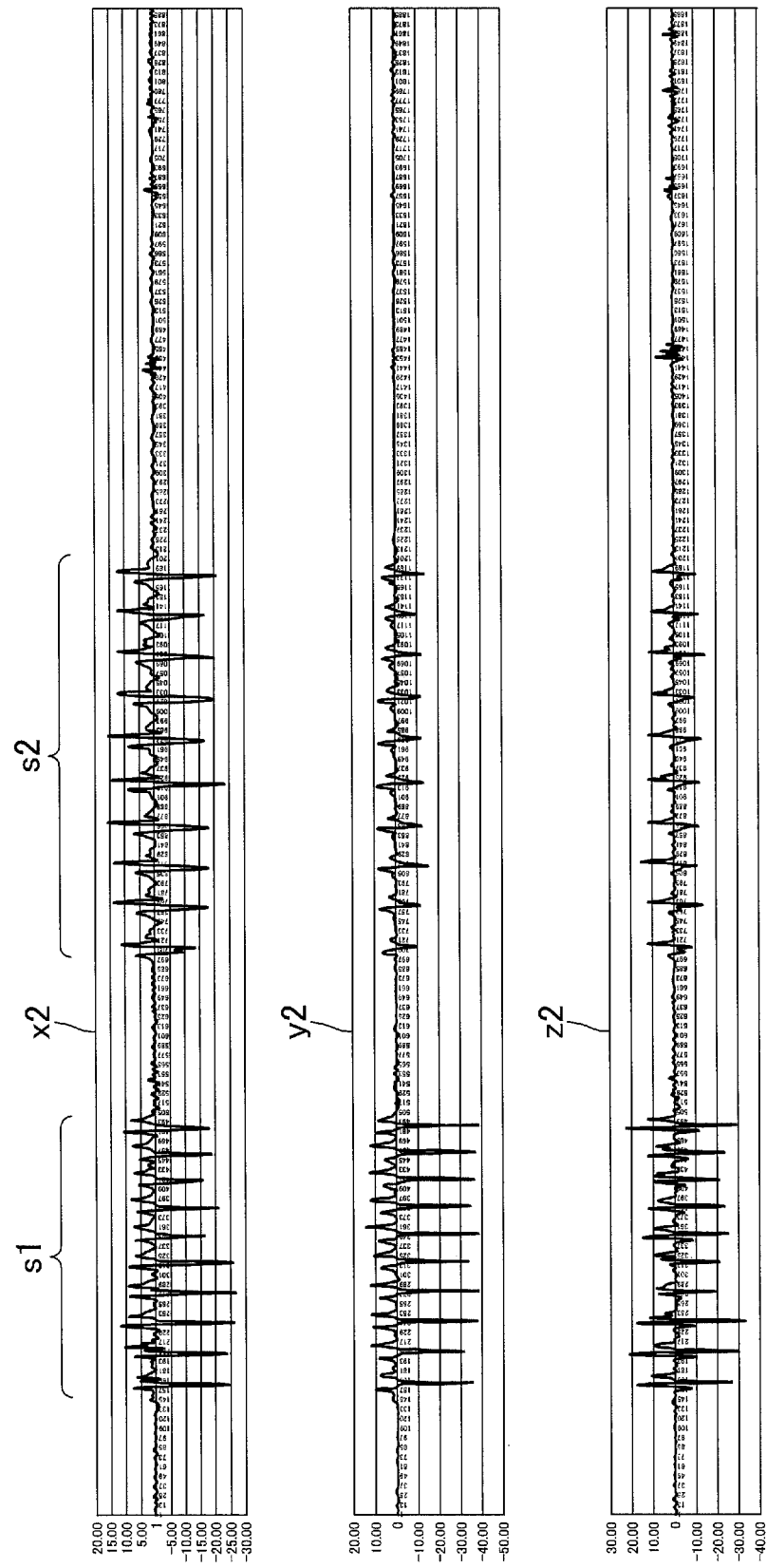
FIG. 8 is an explanatory diagram illustrating an example graph of a change per unit time in output data of a three-axis acceleration sensor.

Therefore, the determination unit 112 may determine that the user has shaken the information processing apparatus 100 when the absolute value of a change per unit time of an acceleration along one, some or all of the axes has exceeded a predetermined threshold. FIG. 8 is an explanatory diagram illustrating an example graph of a change per unit time in the output data of the three-axis acceleration sensor. FIG. 8 illustrates data x2 along the x-axis, data y2 along the y-axis, and data z2 along the z-axis. FIG. 8 also illustrates sections s1 and s2 in which the user has shaken the information processing apparatus 100.

The determination unit 112 performs the determination using acceleration changes $dX_i$, $dY_i$, and $dZ_i$, per unit time in the i-th data, which are defined below. Note that $X_i$, $Y_i$, and $Z_i$ are the values in the X, Y, and Z directions, respectively, of the i-th data of the acceleration sensor. Also, t, is time when the i-th data is obtained.

$$dX_i=(X_i-X_{i-1})/(t_i-t_{i-1})$$

$$dY_i=(Y_i-Y_{i-1})/(t_i-t_{i-1})$$

$$dZ_i=(Z_i-Z_{i-1})/(t_i-t_{i-1})$$

For example, if any one of $dX_i$, $dY_i$, and $dZ_i$ has an absolute value exceeding a predetermined threshold $C_2$, i.e., $|dX_i|>C_2$, $|dY_i|>C_2$, or $|dZ_i|>C_2$, the determination unit 112 determines that the user has shaken the information processing apparatus 100 at the time of the i-th data. Alternatively, for example, if the length of a three-dimensional vector ($dX_i$, $dY_i$, $dZ_i$) has exceeded a predetermined threshold $C_3$, i.e., $(dX_i^2+dY_i^2+dZ_i^2)^{1/2}>C_3$, the determination unit 112 determines that the user has shaken the information processing apparatus 100 at the time of the i-th data.

Thus, by performing the determination using a change per unit time in an acceleration along one, some or all of the axes, the determination unit 112 can remove a continuous change in an acceleration, which is considered as noise, when the user is not shaking the information processing apparatus 100, thereby achieving the determination.

By the above process, the determination unit 112 can determine whether or not the user has shaken the information processing apparatus 100. Here, in most cases, the value of the acceleration sensor can be obtained only when a change occurs in the value. In this case, the value of the acceleration sensor fails to be obtained at predetermined intervals. Also, different acceleration sensors have different intervals during which the value can be obtained. For example, while some acceleration sensors can obtain data 200 times per second, other acceleration sensors can obtain a maximum of only 50 times per second.

When different acceleration sensors have different intervals during which the value can be obtained, then if the determination unit 112 performs the determination using a change per unit time, it is more difficult to detect a peak of the acceleration change as the interval increases. Therefore, the longer the interval during which the value can be obtained from the acceleration sensor, the more difficult it is for the determination unit 112 to determine that the user has shaken the information processing apparatus 100. In other words, if the frequency at which it is determined whether or not the information processing apparatus 100 has been shaken is not the same, then even when the information processing apparatus 100 is shaken in the same way, some apparatuses may need to be shaken for 5 sec, while other apparatuses may need to be shaken for 20 sec, until the percentage of completion is 100%, for example.

However, it is desirable that the application of generating a secret key be widely distributed. Therefore, it is desirable that the determination of the determination unit 112 be performed according to the same algorithm in all apparatuses.

Therefore, in order to accommodate a difference in sensor performance between each apparatus, the sensor data obtaining unit 111 may obtain a new sensor value from the sensor unit 160 after a predetermined period of time has elapsed since the sensor data obtaining unit 111 obtained the previous sensor value from the sensor unit 160. The sensor data obtaining unit 111 may set the predetermined period of time to any value. For example, the predetermined period of time may be set according to a sensor which obtains a value at longer intervals. Thus, by adjusting the intervals at which the sensor data obtaining unit 111 obtains a value from the sensor unit 160, the information processing apparatus 100 can accommodate a difference between sensor performance between each apparatus, and therefore, the determination of the determination unit 112 is performed according to the same algorithm in all apparatuses.

Alternatively, in order to accommodate a difference in sensor performance between each apparatus, the sensor data obtaining unit 111 may measure average intervals S at which the sensor data obtaining unit 111 can obtain a value from the sensor unit 160, during a predetermined period of time, e.g., a predetermined period of time from the activation of the key generation application. For example, the sensor data obtaining unit 111 obtains values from the sensor unit 160 for T seconds. If it is assumed that N values has been obtained from the sensor unit 160 for T seconds, the average interval S is T/N (S=T/N). The determination unit 112 may change the value of the predetermined threshold $C_1$, depending on the average interval S calculated by the sensor data obtaining unit 111. In other words, the determination unit 112 deals with $C_1$ as a function of S, i.e., $C_1(S)$. Specifically, the wider the average interval S, the more difficult it is for the determination unit 112 to determine that the information processing apparatus 100 has been shaken. Therefore, it is desirable that the function $C_1(S)$ be a function which decreases with an increase in S.

Thus, by using a period of time from the activation of the key generation application until the start of obtaining a value of the sensor unit 160 which is used as randomness for key generation, the sensor data obtaining unit 111 can accommodate a difference in sensor performance between each apparatus without the user's knowledge.

In some sensors, information about intervals at which a value can be obtained may be obtained using an application programming interface (API). However, in some sensors, an extraordinary value (e.g., zero) is returned as intervals at which a value can be obtained instead of a correct value. If an extraordinary value is returned as intervals at which a value can be obtained, information about correct intervals fails to be obtained. Therefore, if the sensor data obtaining unit 111 actually measures intervals at which a value can be obtained instead of using the value of API, the information processing apparatus 100 of this embodiment is advantageously not affected by an extraordinary value.

Thus, by changing the value of the predetermined threshold $C_1$, depending on the average interval S calculated by the sensor data obtaining unit 111 as described above, the determination unit 112 can accommodate a difference in sensor performance between each apparatus.

Figure 9:
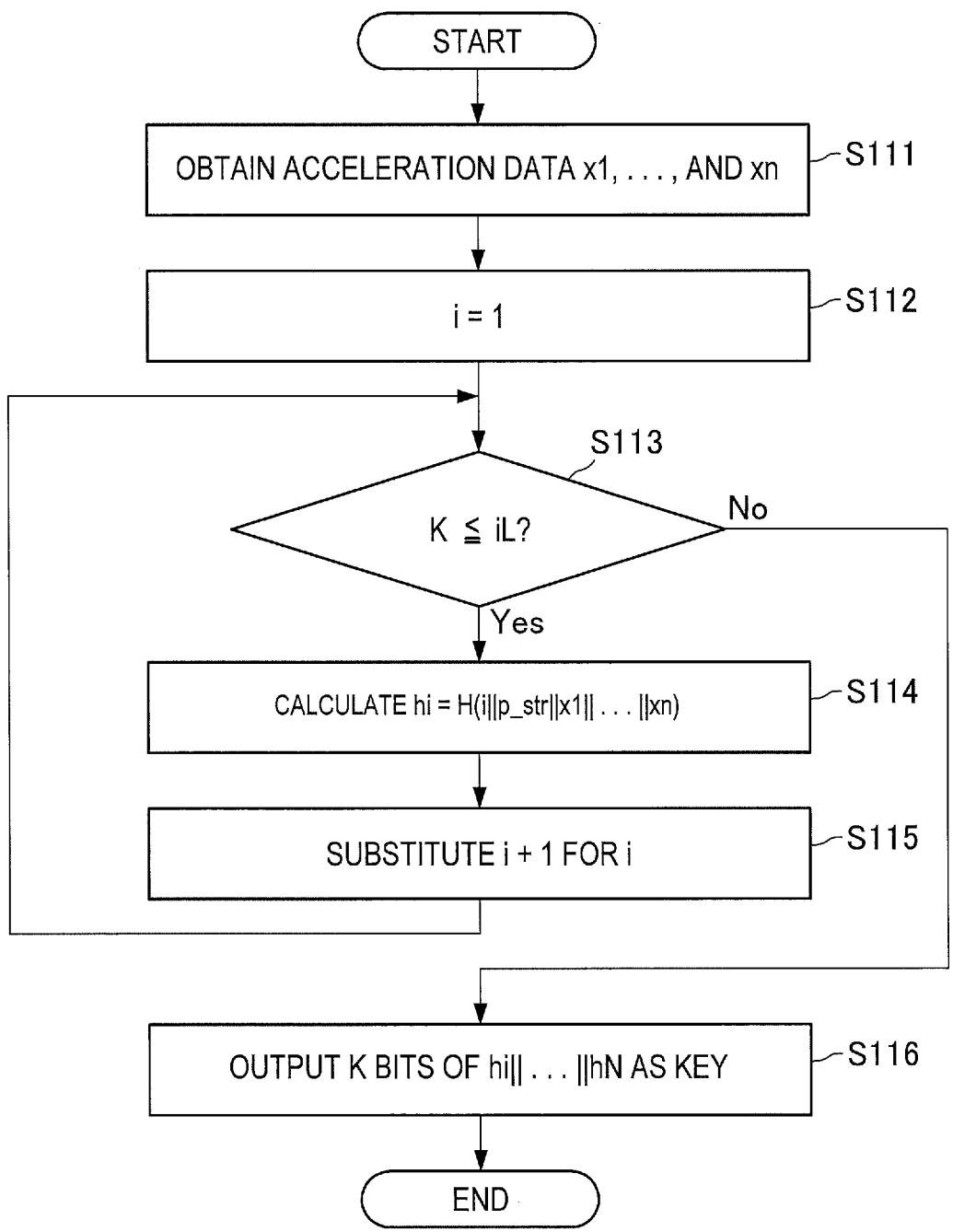
FIG. 9 is a flowchart illustrating an example operation of an information processing apparatus 100 according to an embodiment of the present disclosure.

Next, an example of the process of generating a secret key in step S105 of FIG. 3 will be described. FIG. 9 is a flowchart illustrating an example operation of the information processing apparatus 100 according to an embodiment of the present disclosure. FIG. 9 illustrates details of the example of the process of generating a secret key in step S105 of FIG. 3. An example operation of the information processing apparatus 100 according to an embodiment of the present disclosure will now be described with reference to FIG. 9. Note that it is assumed the following process is performed by the key generation unit 114. It is also assumed that the secret key generated by the key generation unit 114 has a bit length of K bits, and the key generation unit 114 employs a function H of compressing data into L bits. Note that the function of compressing data is, for example, SHA256, in which L=256.

The key generation unit 114, when the percentage of completion p has reached 100%, obtains n pieces of acceleration data $x_1, \ldots,$ and $x_n$ which have been obtained from the start of the key generation process until the percentage of completion p is 100%, from the sensor data obtaining unit 111 (step S111). After having obtained the acceleration data $x_1, \ldots,$ and $x_n$ from the sensor data obtaining unit 111, the key generation unit 114 sets a variable i to one (step S112), and thereafter, determines whether or not K is smaller than or equal to iL (i.e., K≤iL) (step S113).

If the result of the determination in step S113 is positive (i.e., K≤iL) (step S113, Yes), the key generation unit 114 inputs a bit sequence $(i\|p\_str\|x_1\| \ldots \|x_n)$ which is a concatenation of i, apparatus unique information (e.g., a MAC address) p_str, and $x_1, \ldots,$ and $x_n$ to the function H for i=1, . . . , and N, to obtain data $h_1, \ldots,$ and $h_n$ having a length of L bits (e.g., 256 bits). In other words, the key generation unit 114 calculates $h_i=H(i\|p\_str\|x_1\|\ldots\|x_n)$ (step S114). After the calculation of $h_i$ in step S114, the key generation unit 114 substitutes i+1 for i (step S115), and the determination process of step S113 is performed again.

On the other hand, if the result of the determination in step S113 is negative (i.e., K>iL) (step S113, No), the key generation unit 114 outputs K bits of data $h_1\|\ldots\|h_n$ having L×N bits as a secret key (step S116).

Figure 10:
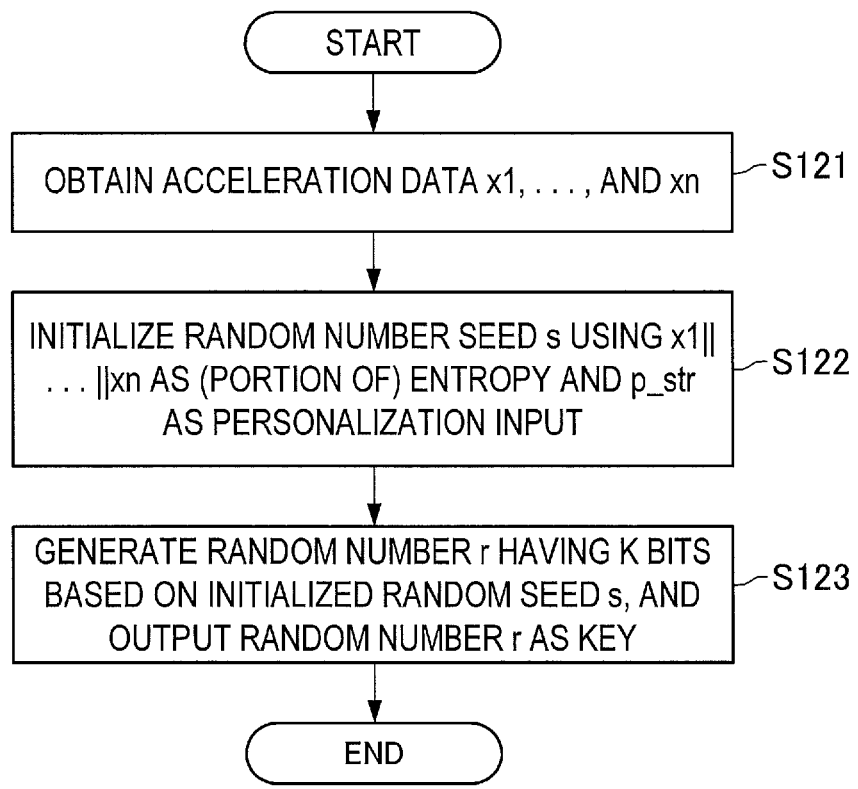
FIG. 10 is a flowchart illustrating an example operation of an information processing apparatus 100 according to an embodiment of the present disclosure.

Another example of the secret key generation process of step S105 of FIG. 3 will be described. FIG. 10 illustrates an example operation of the information processing apparatus 100 according to an embodiment of the present disclosure. FIG. 10 illustrates details of the example of the secret key generation process of step S105 of FIG. 3, where a random number generated using a pseudorandom number generation algorithm is a secret key. Note that the pseudorandom number generation algorithm is, for example, a deterministic random bit generator (DRBG) such as NIST SP800-90A, etc. An example operation of the information processing apparatus 100 according to an embodiment of the present disclosure will now be described with reference to FIG. 10. Note that it is assumed that the following process is performed by the key generation unit 114. It is also assumed that the secret key generated by the key generation unit 114 has a bit length of K bits.

The key generation unit 114, when the percentage of completion p has reached 100%, obtains n pieces of acceleration data $x_1, \ldots,$ and $x_n$ which have been obtained from the start of the key generation process until the percentage of completion p is 100%, from the sensor data obtaining unit 111 (step S121). After having obtained the acceleration data $x_1, \ldots,$ and $x_n$ from the sensor data obtaining unit 111, the key generation unit 114 initializes a random number seed s using a bit sequence $x_1\| \ldots \|x_n$ as an entropy or a portion of an entropy, and apparatus unique information (e.g., a MAC address) p_str as an personalization input (step S122).

After having initialized the random number seed s in step S122, the key generation unit 114 generates a random number r having K bits based on the initialized random number seed s, and outputs the random number r as a key (step S123). Thus, by performing the series of steps of FIG. 10, the key generation unit 114 can generate a secret key using n pieces of acceleration data $x_1, \ldots,$ and $x_n$ which have been obtained from the start of the key generation process until the percentage of completion p is 100%.

Figure 11:
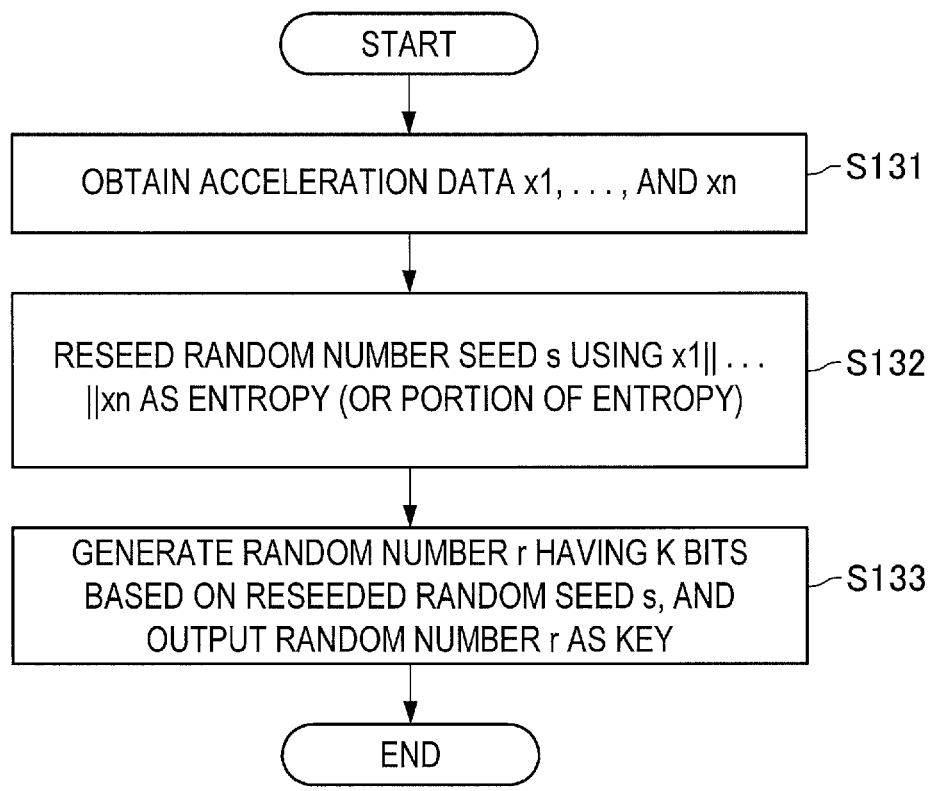
FIG. 11 is a flowchart illustrating an example operation of an information processing apparatus 100 according to an embodiment of the present disclosure.

Still another example of the secret key generation process of step S105 of FIG. 3 will be described. FIG. 11 illustrates an example operation of the information processing apparatus 100 according to an embodiment of the present disclosure. FIG. 11 illustrates details of the example of the secret key generation process of step S105 of FIG. 3, where a random number generated using a pseudorandom number generation algorithm is a secret key.

The key generation unit 114, when the percentage of completion p has reached 100%, obtains n pieces of acceleration data $x_1, \ldots,$ and $x_n$ which have been obtained from the start of the key generation process until the percentage of completion p is 100%, from the sensor data obtaining unit 111 (step S131). After having obtained the acceleration data $x_1, \ldots,$ and $x_n$ from the sensor data obtaining unit 111, the key generation unit 114 reseeds a random number seed s using a bit sequence $x_1\| \ldots \|x_n$ as an entropy or a portion of an entropy (step S132).

After having reseeded the random number seed s in step S122, the key generation unit 114 generates a random number r having K bits based on the initialized random number seed s, and outputs the random number r as a key (step S133).

By performing the above steps, the key generation unit 114 can generate a key using the acceleration data $x_1, \ldots,$ and $x_n$. The key generation unit 114 uses the acceleration data received from the sensor unit 160, without modification, to generate a key, and therefore, can generate a key having a totally different value even if the acceleration data has only a slightly different value. Therefore, the information processing apparatus 100 according to an embodiment of the present disclosure can make it difficult to generate the same key again, thereby ensuring the security of the secret key.

In the above embodiment, a key which needs to be secret (secret key) is generated. Examples of such a key include a common key used in common key cryptography, a secret key used in public key cryptography, and the like. Moreover, a public key used in public key cryptography may be generated based on the secret key generated in the above embodiment.

For example, if the generated secret key is one for RSA (prime numbers p, q), the key generation unit 114 can generate a public key (composite number N=pq) using the secret key. Alternative, for example, if the generated secret key is one for the elliptic curve digital signature algorithm (ECDSA) (scalar), the key generation unit 114 can generate a public key y (G multiplied by a scalar, i.e., y=xG, where G is a base point) using the secret key.

For example, if the generated secret key (vector x) is one for a public key authentication scheme which employs multi-order multivariate simultaneous equations that are difficult to solve as a basis for security, described in JP 2012-98690A, etc., the key generation unit 114 can generate a public key y (y=F(x), where F is a function represented by a multivariate quadratic polynomial) using the secret key.

The information processing apparatus 100 may output the public key generated by the key generation unit 114 as described above through the output unit 130 in a manner which allows the user to visually recognize the public key. For example, the key generation unit 114 may convert the generated public key into information which allows the user to visually recognize the public key by encoding the public key using base64, etc., and the output control unit 115 may perform a control to output the information generated by the key generation unit 114 through the output unit 130.

The public key generated by the key generation unit 114 as described above may, for example, be transferred from the information processing apparatus 100 to another apparatus through radio communication such as Bluetooth (registered trademark), Wi-Fi, near field communication (NFC), etc., wired communication such as a USB cable, etc., copying by a manual operation such as inputting text, etc., or the like, and then stored in the apparatus as the receiver.

As described in the above embodiment, the key (a secret key and a public key) generated by the key generation unit 114 may be stored in the information processing apparatus 100, or may be stored in any other apparatus including a portable device such as a smartphone, tablet terminal, USB memory, etc., that are separated from the information processing apparatus 100. Thereafter, the key generated by the key generation unit 114 may be invariably permitted to be used, or alternatively, may be switched between the state in which the key is permitted to be used and the state in which the key is forbidden to be used, by a device, such as a button, switch, etc., provided in an apparatus which stores the key. Specifically, when the key is stored in a smartphone, the switching device may be a function which is provided by an application installed in the apparatus, such as a function which is attached to a home screen to receive the user's operation, and is called a widget.

The apparatus which stores the secret key may perform a control to automatically respond to a public key authentication request using the secret key if the secret key is permitted to be used, and not to respond to a public key authentication request using the secret key if the secret key is forbidden to be used.

2. EXAMPLE HARDWARE CONFIGURATION

Figure 12:
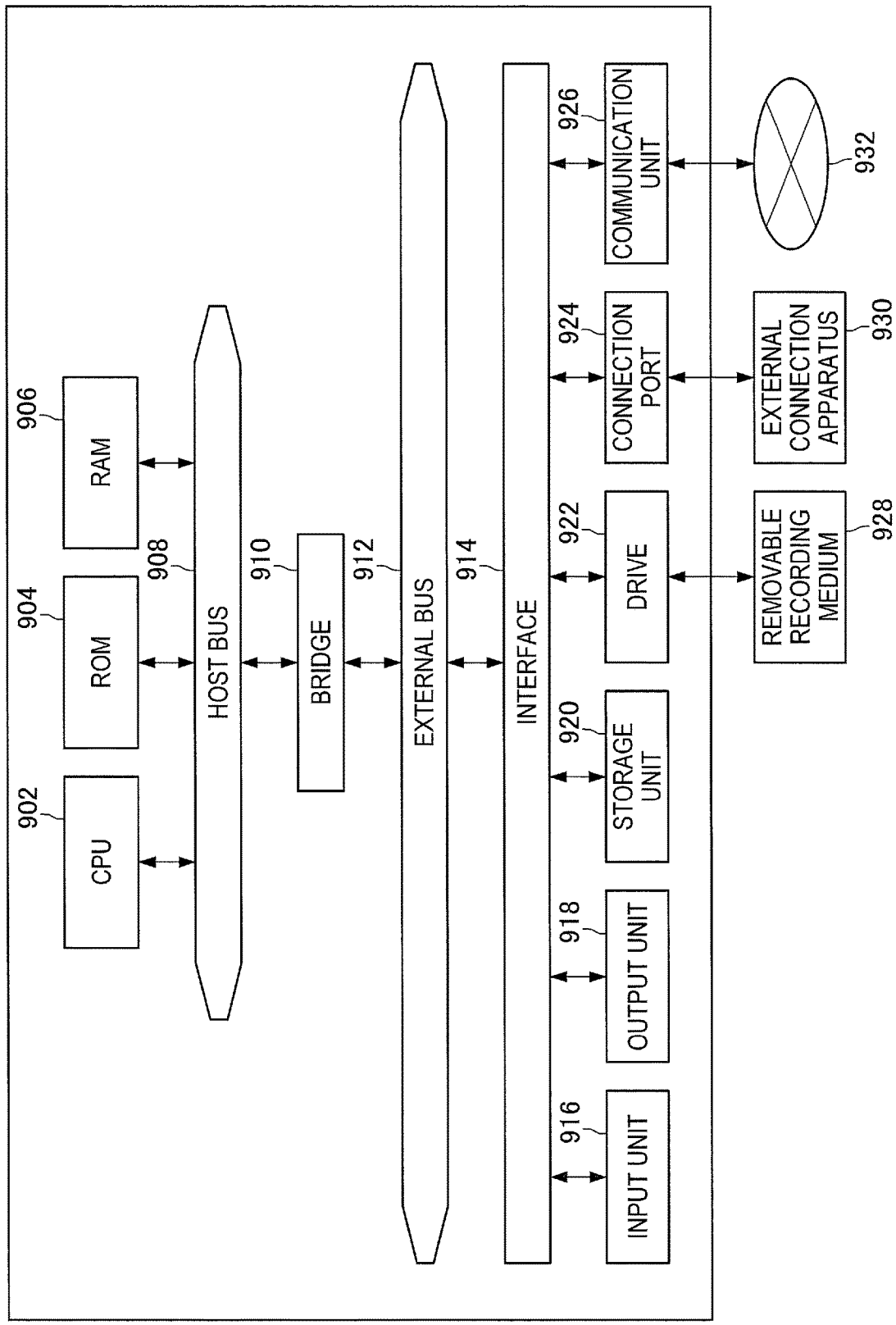
FIG. 12 is an explanatory diagram illustrating an example hardware configuration.

Each algorithm described above can be performed by using, for example, a hardware configuration of the information processing apparatus illustrated in FIG. 12. That is, the process of each algorithm can be carried out by controlling the hardware illustrated in FIG. 12 using a computer program. Additionally, this hardware may be provided in any form including, for example, a personal computer, any mobile information terminal such as a mobile phone, PHS or PDA, game machine, contact or non-contact IC chip, contact or non-contact IC card, or various information appliances. Moreover, PHS is an abbreviation for Personal Handyphone System. Also, PDA is an abbreviation for Personal Digital Assistant.

As illustrated in FIG. 12, this hardware mainly includes a CPU 902, a ROM 904, a RAM 906, a host bus 908, and a bridge 910. This hardware further includes an external bus 912, an interface 914, an input unit 916, an output unit 918, a storage unit 920, a drive 922, a connection port 924, and a communication unit 926. CPU is an abbreviation for Central Processing Unit. ROM is an abbreviation for Read Only Memory. RAM is an abbreviation for Random Access Memory.

The CPU 902 functions as an arithmetic processing unit or a control unit, for example, and controls all or a part of the operation of each constituent element based on various programs stored in the ROM 904, the RAM 906, the storage unit 920, or a removable recording medium 928. The ROM 904 is a device for storing, for example, a program to be loaded on the CPU 902 or data or the like used in an arithmetic operation. The RAM 906 temporarily or permanently stores, for example, a program to be loaded on the CPU 902 or various parameters or the like suitably changed in execution of the program.

These constituent elements are, for example, connected to each other by the host bus 908 capable of performing high-speed data transmission. The host bus 908 is, for example, connected through the bridge 910 to the external bus 912 having a relatively low data transmission speed. The input unit 916 is, for example, a mouse, keyboard, touch panel, button, switch, or lever. Also, the input unit 916 may be a remote control that can transmit a control signal by using infrared light or other radio waves. The input unit 916 may be various sensors, such as a geomagnetic sensor, acceleration sensor, or the like, or something which obtains a current position, such as a GPS or the like.

The output unit 918 is, for example, a display device such as a CRT, LCD, PDP or ELD, audio output device such as a speaker or headphone, printer, mobile phone, or fax machine, that can visually or audibly notify a user of acquired information. CRT is an abbreviation for Cathode Ray Tube. LCD is an abbreviation for Liquid Crystal Display. PDP is an abbreviation for Plasma Display Panel. ELD is an abbreviation for Electro-Luminescence Display.

The storage unit 920 is a device for storing various types of data. The storage unit 920 is, for example, a magnetic storage device such as a hard disk drive (HDD) or the like, semiconductor storage device, optical storage device, or magneto-optical storage device. HDD is an abbreviation for Hard Disk Drive.

The drive 922 is a device that reads information stored on the removable recording medium 928 such as a magnetic disk, optical disk, magneto-optical disk, or semiconductor memory, or writes information to the removable recording medium 928. The removable recording medium 928 is, for example, a DVD medium, Blu-ray medium, HD-DVD medium, various types of semiconductor storage media, or the like. Of course, the removable recording medium 928 may be, for example, an IC card on which a non-contact IC chip is mounted, or an electronic device. IC is an abbreviation for Integrated Circuit.

The connection port 924 is a port such as an USB port, IEEE1394 port, SCSI, RS-232C port, or port for connecting an externally connected device 930 such as an optical audio terminal. The externally connected device 930 is, for example, a printer, mobile music player, digital camera, digital video camera, or IC recorder. USB is an abbreviation for Universal Serial Bus. SCSI is an abbreviation for Small Computer System Interface.

The communication unit 926 is a communication device for connecting to a network 932, and is, for example, a communication card for a wired or wireless LAN, Bluetooth (registered trademark), or WUSB, optical communication router, ADSL router, or device for contact or non-contact communication. The network 932 connected to the communication unit 926 is configured from a wired or wireless network, and is, for example, the Internet, a home LAN, infrared communication, visible light communication, broadcasting, or satellite communication. LAN is an abbreviation for Local Area Network. WUSB is an abbreviation for Wireless USB. ADSL is an abbreviation for Asymmetric Digital Subscriber Line.

For example, when the information processing apparatus 100 has such a hardware configuration, the functionality of the control unit 110 may, for example, be carried out by the CPU 902. The functionality of the input unit 120 may, for example, be carried out by the input unit 916. The functionality of the output unit 130 may, for example, be carried out by the output unit 918. The functionality of the communication unit 140 may, for example, be carried out by the communication unit 926. The functionality of the storage unit 140 may, for example, be carried out by the ROM 904, RAM 906, storage unit 920, or removable recording medium 928. The functionality of the sensor unit 160 may, for example, be carried out by the input unit 916.

3. CONCLUSION

As described above, according to an embodiment of the present disclosure, the information processing apparatus 100 is provided which generates key information, particularly a secret key, using information output by the sensor unit 160 which detects a motion of the information processing apparatus 100, without forcing the user to perform a particular operation. The information processing apparatus 100 according to an embodiment of the present disclosure generates key information using information output by the sensor unit 160 during a predetermined period of time, e.g., a period of time from the user instructs the information processing apparatus 100 to start generating the key information until sufficient information is obtained through the sensor unit 160 (e.g., until the percentage of completion p is 100%).

The information processing apparatus 100 according to an embodiment of the present disclosure generates key information using information output by the sensor unit 160 during a predetermined period of time. Therefore, when the information output by the sensor unit 160 is used as randomness for generation of secret information, sufficient randomness can be obtained with less burden on the user and with ease.

The information processing apparatus 100 according to an embodiment of the present disclosure also adjusts intervals at which sensor data output by the sensor unit 160 is obtained, taking into consideration the case where there is a difference in sensor performance between each apparatus. This allows the information processing apparatus 100 according to an embodiment of the present disclosure to provide a similar sensation which the user experiences during operation of the apparatus even when there is a difference in sensor performance between each apparatus.

The steps in the processes performed by each apparatus in the present specification may not necessarily be processed chronologically in the orders described in the sequence diagrams and the flowcharts. For example, the steps in the processes performed by each apparatus may be processed in different orders from the orders described in the flowcharts or may be processed in parallel.

Also, a computer program causing hardware such as a CPU, a ROM, and a RAM included in each apparatus to carry out the equivalent functions as the above-described configuration of each apparatus can be generated. Also, a storage medium having the computer program stored therein can be provided. Also, by configuring each functional block illustrated in the functional block diagram as hardware, the series of processes can also be realized by the hardware. Also, the computer program can be distributed as a dedicated application program for various information processing terminals such as smartphones or tablets from a predetermined application distribution site on a network such as the Internet. The application distribution site can be provided by a server apparatus including a storage apparatus that stores a program and a communication apparatus that transmits the application program in response to a download request from clients (various information processing terminals such as smartphones or tablets).

It should be understood by those skilled in the art that various modifications, combinations, sub-combinations and alterations may occur depending on design requirements and other factors insofar as they are within the scope of the appended claims or the equivalents thereof.

Although, in the above embodiment, for example, the percentage of completion is calculated as progress information, the present disclosure is not limited to this example. If the task of obtaining sensor data used for generation of a secret key is assumed to be completed when the information processing apparatus 100 has been shaken a predetermined number of times, the progress information calculation unit 113 may count the number of times which the information processing apparatus 100 has been shaken as progress information, for example. In this case, the progress information calculation unit 113 may count the number of times which the information processing apparatus 100 has been shaken, to calculate, as progress information, how many times the information processing apparatus 100 has already been shaken or how many times the information processing apparatus 100 should be further shaken for generation of a key.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1) An information processing apparatus including:
a sensor data obtaining unit configured to obtain predetermined information from a sensor, the sensor obtaining the predetermined information by sensing; and a key generation unit configured to generate key information for use in an authentication process, based on the information which is obtained by the sensor data obtaining unit during a predetermined period of time.

(2) The information processing apparatus according to (1), further including:
a progress information calculation unit configured to output information based on progress information until obtaining of the information from the sensor is completed.

(3) The information processing apparatus according to (2), wherein the progress information calculation unit calculates progress information until obtaining of the information for use in the generation of the key information by the key generation unit has been completed.

(4) The information processing apparatus according to (2) or (3), further including:

an output unit configured to output the progress information calculated by the progress information calculation unit.

(5) The information processing apparatus according to any one of (1) to (4), further including:

a progress information calculation unit configured to calculate progress information until obtaining of the information for use in the generation of the key information by the key generation unit is completed.

(6) The information processing apparatus according to any one of (1) to (5), further including:

a determination unit configured to determine whether or not the information obtained by the sensor data obtaining unit is effective in the generation of the key information by the key generation unit.

(7) The information processing apparatus according to (6), wherein the determination unit performs the determination using a change per unit time in the information obtained by the sensor data obtaining unit.

(8) The information processing apparatus according to (6), wherein the determination unit performs the determination using the absolute value of the information obtained by the sensor data obtaining unit.

(9) The information processing apparatus according to any one of (1) to (8), wherein the sensor data obtaining unit obtains acceleration information which the sensor newly obtains by sensing after a predetermined time has elapsed since the obtaining of the previous information.

(10) The information processing apparatus according to (9), wherein the sensor data obtaining unit determines the predetermined time using average intervals at which the information is obtained from the sensor, before the predetermined period of time.

(11) The information processing apparatus according to any one of (1) to (10), wherein the information obtained by the sensor data obtaining unit is acceleration information.

(12) The information processing apparatus according to any one of (1) to (11), wherein the key generation unit generates the key information using the information obtained by the sensor data obtaining unit and information unique to the individual information processing apparatus.

(13) The information processing apparatus according to any one of (1) to (12), wherein the key information generated by the key generation unit is a secret key.

(14) An information processing method including:

obtaining predetermined information from a sensor, the sensor obtaining the predetermined information by sensing; and generating key information for use in an authentication process, based on the information which is obtained during a predetermined period of time.

(15) A non-transitory computer-readable recording medium having a program recorded thereon, the program causing a computer to execute:

obtaining predetermined information from a sensor, the sensor obtaining the predetermined information by sensing; and generating key information for use in an authentication process, based on the information which is obtained during a predetermined period of time.

What is claimed is:

1. An information processing apparatus, comprising:
a three-axis acceleration sensor configured to detect a motion of the information processing apparatus in at least one of x-direction, y-direction, or z-direction; and
a central processing unit (CPU) configured to:
obtain first information, that corresponds to the detected motion of the information processing apparatus, from the three-axis acceleration sensor based on a user operation on the information processing apparatus,
wherein the obtained first information include a first plurality of information pieces;
determine, based on a threshold value, effectiveness of the obtained first information;
calculate progress information corresponding to a percentage value of a second plurality of information pieces of the first plurality of information pieces that are obtained from the three-axis acceleration sensor;
update the percentage value by one of a first value or a second value, based on the obtained second plurality of information pieces and the determination of the effectiveness of the obtained second plurality of information pieces,
wherein the second value is a sum of the first value and a third value, and
wherein the first value is greater than the third value;
generate key information for an authentication process, based on the first information that is obtained from the three-axis acceleration sensor and the updated percentage value that is 100%; and
control the information processing apparatus to display the generated key information.

2. The information processing apparatus according to claim 1, wherein the CPU is further configured to output the calculated progress information on the information processing apparatus.

3. The information processing apparatus according to claim 1, wherein the CPU is further configured to calculate progress information until acquisition of the first information for the generation of the key information is completed.

4. The information processing apparatus according to claim 1, wherein the CPU is further configured to determine, based on a change per unit time in the obtained first information, the effectiveness of the obtained first information.

5. The information processing apparatus according to claim 1, wherein the CPU is further configured to determine, based on an absolute value of the obtained first information, the effectiveness of the obtained first information.

6. The information processing apparatus according to claim 1, wherein the CPU is further configured to obtain new information from the three-axis acceleration sensor after a second time period has elapsed since the first information is obtained.

7. The information processing apparatus according to claim 6, wherein the CPU is further configured to calculate the second time period based on average intervals at which the first information is obtained from the three-axis acceleration sensor.

8. The information processing apparatus according to claim 1, wherein the first information is acceleration information.

9. The information processing apparatus according to claim 1, wherein the CPU is further configured to generate the key information, based on the obtained first information and second information which is unique to the information processing apparatus.

10. The information processing apparatus according to claim 1, wherein the key information is a secret key.

11. An information processing method, comprising:
in an information processing apparatus that comprises a central processing unit (CPU):
obtaining information, that corresponds to a motion of the information processing apparatus in at least one of x-direction, y-direction, or z-direction, from a three-axis acceleration sensor based on a user operation on the information processing apparatus,
wherein the obtained information include a first plurality of information pieces;
determining, based on a threshold value, effectiveness of the obtained information;
calculating progress information corresponding to a percentage value of a second plurality of information pieces of the first plurality of information pieces that are obtained from the three-axis acceleration sensor;
updating the percentage value by one of a first value or a second value, based on the obtained second plurality of information pieces and the determination of the effectiveness of the obtained second plurality of information pieces,
wherein the second value is a sum of the first value and a third value, and
wherein the first value is greater than the third value;
generating key information for an authentication process, based on the information that is obtained from the three-axis acceleration sensor and the updated percentage value that is 100%; and
displaying the generated key information on the information processing apparatus.

12. A non-transitory computer-readable medium having stored thereon, computer-executable instructions which, when executed by an information processing apparatus, cause the information processing apparatus to execute operations, the operations comprising:
obtaining information, that corresponds to a motion of the information processing apparatus in at least one of x-direction, y-direction, or z-direction, from a three-axis acceleration sensor based on a user operation on the information processing apparatus,
wherein the obtained information include a first plurality of information pieces;
determining, based on a threshold value, effectiveness of the obtained information;
calculating progress information corresponding to a percentage value of a second plurality of information pieces of the first plurality of information pieces that are obtained from the three-axis acceleration sensor;
updating the percentage value by one of a first value or a second value, based on the obtained second plurality of information pieces and the determination of the effectiveness of the obtained second plurality of information pieces,
wherein the second value is sum of the first value and a third value, and
wherein the first value is greater than the third value;
generating key information for an authentication process, based on the information that is obtained from the three-axis acceleration sensor and updated percentage value that is 100%; and
displaying the generated key information on the information processing apparatus.

* * * * *